US012657483B2

(12) United States Patent
Hoang et al.

(10) Patent No.: US 12,657,483 B2
(45) Date of Patent: Jun. 16, 2026

(54) RULE MINING USING VIRTUAL KNOWLEDGE GRAPH CREATED FROM TEXT

(71) Applicant: International Business Machines Corporation, Armonk, NY (US)

(72) Inventors: Thanh Lam Hoang, Maynooth (IE); Gabriele Picco, Dublin (IE); Vanessa Lopez Garcia, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 17/655,614

(22) Filed: Mar. 21, 2022

(65) Prior Publication Data

US 2023/0297855 A1 Sep. 21, 2023

(51) Int. Cl.
| *G06N 5/025* | (2023.01) |
| *G06F 40/295* | (2020.01) |
| *G06N 5/04* | (2023.01) |

(52) U.S. Cl.
CPC ........... *G06N 5/025* (2013.01); *G06F 40/295* (2020.01); *G06N 5/04* (2013.01)

(58) Field of Classification Search
CPC ......... G06N 5/025; G06N 5/04; G06F 40/295
See application file for complete search history.

(56) References Cited

U.S. PATENT DOCUMENTS

| 10,169,454 B2 | 1/2019 | Ait-Mokhtar et al. |
| 10,592,610 B1 | 3/2020 | Shen et al. |
| 10,853,150 B1 | 12/2020 | Bahrami et al. |
| 10,902,203 B2 | 1/2021 | Patra et al. |
| 2011/0320490 A1 | 12/2011 | Jung et al. |
| 2020/0160194 A1 | 5/2020 | Stoilos et al. |
| 2021/0049169 A1 | 2/2021 | Wardell et al. |
| 2021/0110113 A1 | 4/2021 | Brousseau et al. |
| 2021/0149900 A1 | 5/2021 | Kim et al. |
| 2021/0216885 A1 | 7/2021 | Huang et al. |
| 2021/0279606 A1 | 9/2021 | Srinivasan et al. |
| 2021/0319329 A1 | 10/2021 | Yang et al. |

FOREIGN PATENT DOCUMENTS

| WO | 2014161426 A1 | 10/2014 |

OTHER PUBLICATIONS

Mellace, Simone, K. Vani, and Alessandro Antonucci. "Relation clustering in narrative knowledge graphs." arXiv preprint arXiv: 2011.13647 (2020). (Year: 2020).*

(Continued)

*Primary Examiner* — Miranda M Huang
(74) *Attorney, Agent, or Firm* — Kelsey M. Skodje

(57) ABSTRACT

A method, system, and computer program product are disclosed. The method includes receiving an input text and generating a set of virtual triples, which include pairs of named entities from the input text and relation embedding vectors for each of the pairs, from the input text. The method also includes constructing a virtual knowledge graph (KG) with the set of virtual triples and transforming the virtual KG into a relation-cluster KG. Further, the method includes mining logical rules from the relation-cluster KG.

20 Claims, 6 Drawing Sheets

300

Receive text — 310

Identify entities — 320

Generate virtual triples — 330

Construct virtual KG — 340

Transform virtual KG to relation-cluster KG — 350

Mine rules from relation-cluster KG — 360

Add rules to predictive model — 370

(56)        References Cited

OTHER PUBLICATIONS

Zhang, Jing, et al. "Neural, symbolic and neural-symbolic reasoning on knowledge graphs." AI Open 2 (2021): 14-35. (Year: 2021).*

Li, Tao. Relational clustering models for knowledge discovery and recommender systems. Diss. University of Warwick, 2010. (Year: 2010).*

Lamsiyah, Salima, et al. "An unsupervised method for extractive multi-document summarization based on centroid approach and sentence embeddings." Expert Systems with Applications 167 (2021): 114152. (Year: 2021).*

Lim, Jungwoo, et al. "I know what you asked: Graph path learning using AMR for commonsense reasoning." arXiv preprint arXiv: 2011.00766 (2020). (Year: 2020).*

Bajwa et al., "SBVR Business Rules Generation from Natural Language Specification," https://www.aaai.org/ocs/index.php/SSS/SSS11/paper/view/2378/2918, Artificial Intelligence for Business Agility—Papers from the AAAI 2011 Spring Symposium (SS-11-03), 7 pgs.

Bevilacqua et al., "One SPRING to Rule Them Both: Symmetric AMR Semantic Parsing and Generation without a Complex Pipeline," https://www.researchgate.net/publication/348305083_One_SPRING_to_Rule_Them_Both_Symmetric_AMR_Semantic_Parsing_and_Generation_without_a_Complex_Pipeline/link/5ff7090f92851c13fef61b36/download, Jan. 2021, 11 pgs.

Boufrida et al., "Rule extraction from scientific texts: Evaluation in the specialty of gynecology," https://www.sciencedirect.com/science/article/pii/S1319157820303736, May 20, 2020, 11 pgs.

Calvanese et al., "Mapping Patterns for Virtual Knowledge Graphs," https://arxiv.org/abs/2012.01917, Dec. 3, 2020, 18 pgs.

Calvanese et al., "Realizing Ontology-Based Reusable Interfaces For Data Access Via Virtual Knowledge Graphs," © 2021 Association for Computing Machinery, CHItaly '21, Jul. 11-13, 2021, Bolzano, Italy, ACM ISBN 978-1-4503-8977-Aug. 21, 2007, https://doi.org/10.1145/3464385.3464744, 5 pgs.

Dhingra et al., "Differentiable Reasoning Over a Virtual Knowledge Base," published as a conference paper ICLR 2020, arXiv:2002. 10640v1 [cs.CL] Feb. 25, 2020, 16 pgs.

Dragoni et al., "Combining Natural Language Processing Approaches for Rule Extraction from Legal Documents," https://link.springer.com/chapter/10.1007/978-3-030-00178-0_19, Oct. 23, 2018, 17 pgs.

Frisoni et al., "Unsupervised Descriptive Text Mining For Knowledge Graph Learning," DOI: 10.5220/0010153603160324, In Proceedings of the 12th International Joint Conference on Knowledge Discovery, Knowledge Engineering and Knowledgment Management (IC3K 2020)—vol. 1: KDIR, pp. 316-324, ISBN: 978-989-758-474-9, © 2020.

Github, "DRUM: End-to-End Differentiable Rule Mining on Knowledge Graphs, " https://github.com/alisadeghian/DRUM, print, printed Jan. 26, 2022, 4 pgs.

Haj et al., "The Semantic of Business Vocabulary and Business Rules: An Automatic Generation From Textual Statements," Digital Object Identifier 10.1109/ACCESS.2021.3071623, https://ieeexplore.ieee.org/document/9398685, Apr. 7, 2021, 17 pgs.

Hassanpour et al., "A semantic-based method for extracting concept definitions from scientific publications: evaluation in the autism phenotype domain," Journal of Biomedical Semantics 2013, 4:14, https://link.springer.com/article/10.1186/2041-1480-4-14, 10 pgs.

Hirose et al., "Transductive Data Augmentation With Relational Path Rule Mining For Knowledge Graph Embedding," arXiv:2111.00974v1 [cs.LG] Nov. 1, 2021, 8 pgs.

Chittimalli et al., "BuRRiTo: A Framework to Extract, Specify, Verify and Analyze Business Rules," https://ieeexplore.ieee.org/abstract/document/8952315, 2019 34th IEEE/ACM International Conference on Automated Software Engineering (ASE), 4 pgs.

Li et al., "Rule-Based Data Augmentation For Knowledge Graph Embedding," AI Open 2 (2021) 186-196.

Mahmood et al., "Negative and Positive Association Rules Mining from Text Using Frequent and Infrequent Itemsets," Hindawi Publishing Corporation, The Scientific World Journal, vol. 2014, Article ID 973750, https://www.ncbi.nlm.nih.gov/pmc/articles/PMC4052479/, 11 pgs.

Manine et al., "Learning ontological rules to extract multiple relations of genic interactions from text," https://www.sciencedirect.com/science/article/abs/pii/S1386505609000422, preprint submitted to International Journal of Medical Informatics, Feb. 11, 2019, 8 pgs.

Mell et al., "The NIST Definition of Cloud Computing," Recommendations of the National Institute of Standards and Technology, U.S. Department of Commerce, Special Publication 800-145, Sep. 2011, 7 pgs.

Minervini et al., "Learning Reasoning Strategies in End-to-End Differentiable Proving," Proceedings of the 37th International Conference on Machine Learning, Online, PMLR 119, 2020, 12 pgs.

Qu et al., "RNNLogic: Learning Logic Rules for Reasoning on Knowledge Graphs," arXiv:2010.04029v2 [cs.AI] Jul. 16, 2021, 21 pgs.

Sadeghian et al., "DRUM: End-To-End Differentiable Rule Mining On Knowledge Graphs," https://arxiv.org/abs/1911.00055, Oct. 31, 2019, 13 pgs.

Sheikh, "Knowledge Graph Embedding using Graph Convolutional Networks with Relation-Aware Attention," https://arxiv.org/pdf/2102.07200.pdf, Feb. 14, 2021, 6 pgs.

Socher et al., "Reasoning With Neural Tensor Networks for Knowledge Base Completion," https://papers.nips.cc/paper/2013/file/b337e84de8752b27eda3a12363109e80-Paper.pdf, printed Jan. 26, 22, 10 pgs.

Sun et al., "Reasoning Over Virtual Knowledge Bases With Open Predicate Relations," https://arxiv.org/pdf/2102.07043.pdf, Jun. 14, 2021, 12 pgs.

Suresh et al., "A Hybrid Model For Learning Embeddings And Logical Rules Simultaneously From Knowledge Graphs," arXiv:2009.10800v1 [cs.AI] Sep. 22, 2020, 10 pgs.

Wang et al., "Knowledge Graph Embedding via Graph Attenuated Attention Networks," Digital Object Identifier 10.1109/ACCESS.2019.2963367, https://ieeexplore.ieee.org/stamp/stamp.jsp?tp=&arnumber=8946600, Dec. 31, 2019, 13 pgs.

Xiao et al., "Virtual Knowledge Graphs: An Overview of Systems and Use Cases," http://www.data-intelligence-journal.org/p/24/, Data Intelligence 1(2019), 201-223, doi: 10.1162/dint_a_00011, Apr. 26, 2019, 23 pgs.

IBM. "Government health and human services solutions", retrieved from web https://web.archive.org/web/20220318123515/https:/www.ibm.com/watson-health/solutions/government-healthcare, dated Apr. 8, 2025, 7 pages.

* cited by examiner

100

300

310
Receive text

320
Identify entities

330
Generate virtual triples

340
Construct virtual KG

350
Transform virtual KG to relation-cluster KG

360
Mine rules from relation-cluster KG

370
Add rules to predictive model

500

520C

520D

510

520A

520B

RULE MINING USING VIRTUAL KNOWLEDGE GRAPH CREATED FROM TEXT

BACKGROUND

The present disclosure relates to unsupervised rule mining and, more specifically, to rule mining based on unsupervised construction of virtual knowledge graphs from text.

Knowledge graphs represent relationships between entities and are generally constructed manually or semi-automatically. For example, knowledge graphs can be constructed from structured sources or text with human annotations. Rule mining from knowledge graphs can be used to extract logical rules for applications such as machine reasoning, theorem proving, question answering, and link prediction.

SUMMARY

Various embodiments are directed to a method, which includes receiving an input text and generating a set of virtual triples from the text. The triples include pairs of named entities from the input text and relation embedding vectors for each of the pairs of named entities. The method also includes constructing a virtual knowledge graph (KG) with the set of virtual triples. The virtual KG is transformed into a relation-cluster KG. Logical rules are then minded from the relation-cluster KG.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Aspects of the present disclosure relate generally to rule mining and, more specifically, to rule mining based on unsupervised construction of virtual knowledge graphs from text. While the present disclosure is not necessarily limited to such applications, various aspects of the disclosure may be appreciated through a discussion of various examples using this context.

Knowledge graphs show relationships between entities, which can be represented by triples. For example, familial relationships between entities X, Y, and Z can be represented by triples including (X, hasFather, Z) and (Y, hasFather, Z) in a knowledge graph. Rule mining can be used to extract logical rules from knowledge graphs. For example, based on the aforementioned triples, a logical rule such as (X, isSibling, Y) may be extracted. Rule mining has numerous applications, such as machine reasoning, theorem proving, question answering, and link prediction.

However, knowledge graph construction can be a very expensive and time-consuming task. Knowledge graphs are generally constructed manually or semi-automatically, but this is impractical for large amounts of unstructured data, particularly domain-specific texts. Overcoming these challenges may provide improvements in machine reasoning, natural language processing, question answering, link prediction, etc.

Disclosed herein are techniques for unsupervised construction of virtual knowledge graphs and rule mining therefrom. The virtual knowledge graphs can be generated from text corpora. Named entities can be extracted from the text, and virtual triples can be generated for pairs of these entities and associated relation embedding vectors. A virtual knowledge graph can be constructed from the virtual triples. The virtual knowledge graph can be converted to a relation-cluster knowledge graph by clustering the relation embedding vectors, replacing the relation embedding vectors in the virtual triples with associated cluster identifiers (IDs), and using the cluster IDs as edges in the relation-cluster knowledge graph. Rules can be extracted from the relation-cluster knowledge graph and used to build rule-based predictive models.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
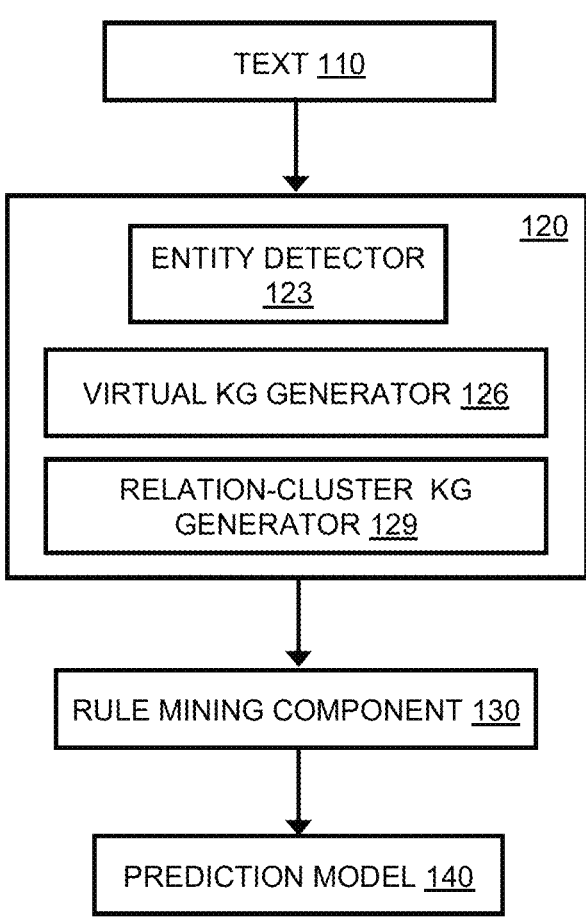
FIG. 1 is a block diagram illustrating a rule mining environment, according to some embodiments of the present disclosure.

Turning now to the figures, FIG. 1 is a block diagram illustrating a rule mining environment 100, according to some embodiments of the present disclosure. Environment 100 can include input text 110, a knowledge graph (KG) construction component 120, a rule mining component 130, and a prediction model 140.

The input text 110 can be an appropriate text (e.g., unstructured text document, text corpus or corpora, etc.) that includes at least two detectable entities. The KG construction component 120 can receive the input text 110. Component 120 includes an entity detector 123, a virtual KG generator 126, and a relation-cluster KG generator 129. The entity detector 123 can detect named entities in the text 110.

The virtual KG generator 126 can also obtain relation embedding vectors for pairs of entities and generate virtual triples containing each pair and relation embedding vector. The virtual KG can be constructed with these virtual triples. For example, a pair of named entities (X, Y) with a relation embedding vector R can have the virtual triple (X, R, Y). In some embodiments, the named entities X and Y can be represented by embedding vectors X and Y. Various techniques can be used to generate a relation embedding for a pair of named entities (e.g., Abstract Meaning Representation (AMR) parsing, ontology learning, dependency parsing, etc.). In some embodiments, the text 110 may be transformed into an AMR using a text-to-AMR parser, such as SPRING (Symmetric PaRsing aNd Generation), although any appropriate technique (e.g., transition base or sequence-to-sequence model) may be used.

AMRs may be interpreted as knowledge graphs. For example, AMRs define nodes and illustrate relationships between the nodes. Therefore, an AMR based on the text 110 can be converted to a knowledge graph format using simple rules, as will be understood by persons of ordinary skill in the art. In some embodiments, a graph neural network (GNN) can be used to produce embeddings of nodes in the AMR. Relations between sets of entities in an AMR graph can be represented by a set of shortest paths or minimum spanning trees that connect the entities. The relation embedding vectors can be obtained by learning embedding vectors of the paths or trees connecting nodes in the AMR.

The relation-cluster KG generator 129 can receive the virtual KG and cluster the relation embedding vectors contained therein. For example, k-means clustering can be used to generate k clusters of relation embedding vectors from the virtual triples. In some embodiments, the virtual relations from a knowledge graph G are clustered into k clusters, where k can be a user-input or automatically selected parameter. Each cluster can be represented by a cluster ID with a centroid embedding vector C. The relation embedding vectors of the virtual triples can then be replaced with the associated cluster IDs. For example, if (X, R, Y) is a triple in the virtual KG, and R is assigned to an $i^{th}$ cluster, i can be assigned as the label of the relation R between X and Y. The relation-cluster KG generator 129 can then refactor the virtual KG using the cluster IDs as edge features.

Figure 2:
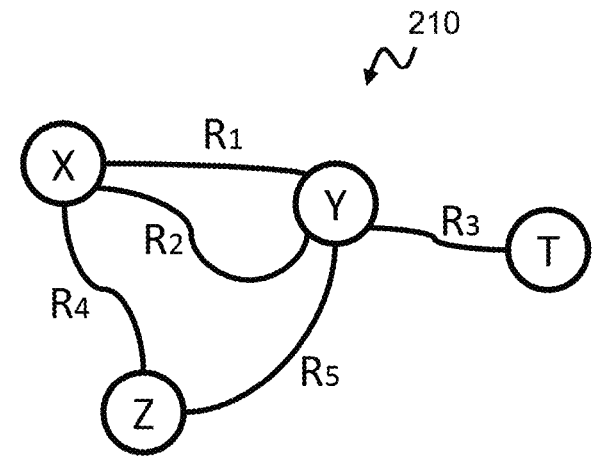
FIG. 2 is a schematic diagram illustrating an example construction of a relation-cluster knowledge graph, according to some embodiments of the present disclosure.
Figure 2:
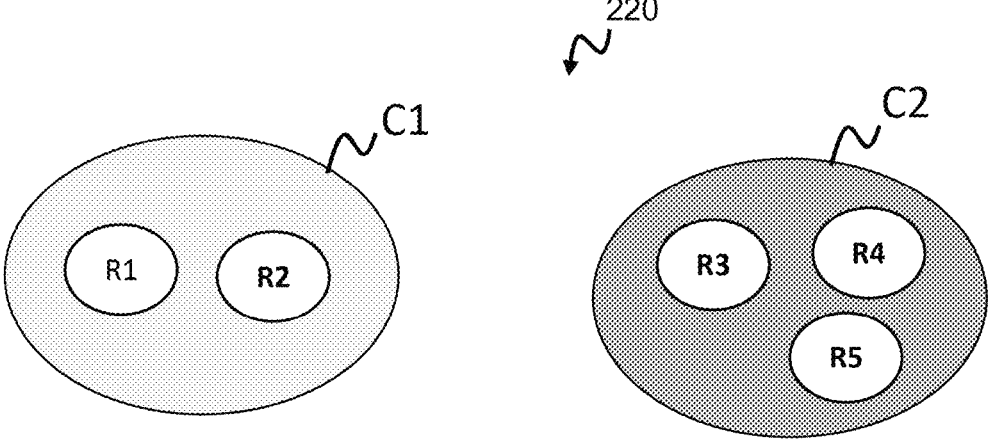
Figure 2:
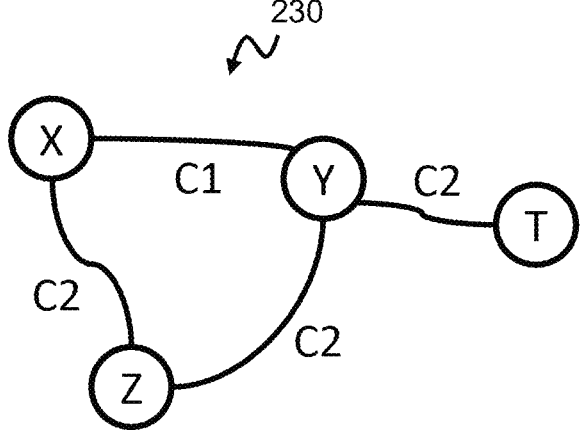

FIG. 2 is a schematic diagram illustrating an example 200 in which a virtual KG is transformed into a relation-cluster KG, according to some embodiments of the present disclosure. The virtual KG 210 may be generated by the virtual KG generator 126 based on the input text 110 (FIG. 1). The virtual KG 210 includes named entities T, X, Y, and Z, which can be identified by the entity detector 123. Virtual triples can be generated for pairs of the entities and corresponding relation embedding vectors. In the illustrated example, the triples used to construct the virtual KG 210 include (X, R1, Y), (X, R2, Y), (Y, R3, T), (X, R4, Z), and (Y, R5, Z).

In some embodiments, the virtual KG may be generated by parsing the input text 110 to identify subject-predicate-object triplets. This may involve analyzing parse trees generated by a natural language processor (e.g., using a tokenizer, a part-of-speech (POS) tagger, a semantic relationship identifier, and/or a syntactic relationship identifier). The subject and objects in the sentences may be represented by nodes in a knowledge graph, whereas the predicate may be represented by an edge. For example, a sentence in a document might read "George II is the King of England." A natural language processing system may parse this sentence to identify a subject ("George II"), a predicate ("is the"), and an object ("King of England"). Based on the parsing, the natural language processing system may generate nodes for "George II" and "King of England." The nodes may be connected by an edge denoting a relationship between the nodes (i.e., indicating that George II is the King of England).

As used herein, a "tokenizer" may be a computer module that performs lexical analysis. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

As used herein, a "POS tagger" may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one document may shed light on the meaning of text elements in another document, particularly if they are part of the same corpus). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

As used herein, a "semantic relationship identifier" may be a computer module that is configured to identify semantic relationships of recognized text elements (e.g., words, phrases) in documents. In some embodiments, the semantic relationship identifier may determine functional dependencies between entities and other semantic relationships.

As used herein, a "syntactic relationship identifier" may be a computer module that is configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

As used herein, a "natural language processor" may be a computer module that is configured to parse a document and generate corresponding data structures for one or more portions of the document. For example, in response to receiving a document at the natural language processing system, the natural language processor may output parsed text elements from the book as data structures. In some embodiments, a parsed text element may be represented in the form of a parse tree or other graph structure.

The relation embedding vectors R1-R5 can be clustered by the relation-cluster KG generator 129 (FIG. 1). In the illustrated example, R1-R5 are distributed into clusters 220 labeled C1 and C2. In some embodiments, the number of clusters is based on an input parameter k=2. Cluster C1 includes vectors R1 and R2, and cluster C2 includes vectors R3-R5. Using the cluster IDs C1 and C2 as centroid embedding vectors, the relation-cluster KG generator 129 can generate a relation-cluster KG 230 with the triples (X, C1, Y), (Y, C2, T), (X, C2, Z), and (Y, C2, Z). In some embodiments, relation clustering can be employed to reduce the cardinality of the set of virtual relations.

Referring again to FIG. 1, the rule mining component 130 can extract logical rules from the relation-cluster KG. In some embodiments, the rules can be represented as Horn-clauses such as (X, C1, Z) AND (Y, C2, Z)=>(X, C3, Y), where C1, C2, and C3 are relation cluster IDs. Examples of rule mining approaches suitable for mining rules from knowledge graphs can include recurrent neural networks (RNNs) (e.g., bidirectional RNNs, such as end-to-end Differentiable RUle Mining (DRUM), probabilistic models, such as RNNLogic, etc.), Conditional Theorem Provers (CTPs), Neural Theorem Provers (NTPs), etc., although any appropriate system for automatically extracting rules may be used.

The logical rules can be used to build a predictive model 140 (e.g., for soft reasoning, question-answering, domain-specific rules engines, etc.). For example, virtual triples can be generated for new text data and input into the predictive model 140. The predictive model 140 can generate an output based on distances between relation embedding vectors R from the input new virtual triples and cluster centers in the relation-cluster KG.

In an example, input text="Anne lives in Dublin, and John was born in Dublin" and query="Anne and John come from the same city," can yield factual triples (Anne, R1, Dublin) and (John, R2, Dublin) and query triple (Anne, R3, John). If R1 is closest to a cluster center C1, R2 is closest to a cluster center C2, and R3 is closest to a cluster center C3, the triples can be converted to (Anne, C1, Dublin), (John, C2, Dublin), and (Anne, C3, John). The predictive model 140 may determine that given the rule (X, C1, Z) AND (Y, C2, Z)=>(X, C3, Y), "Anne and John come from the same city", or query triple (Anne, C3, John), is a correct statement.

Figure 3:
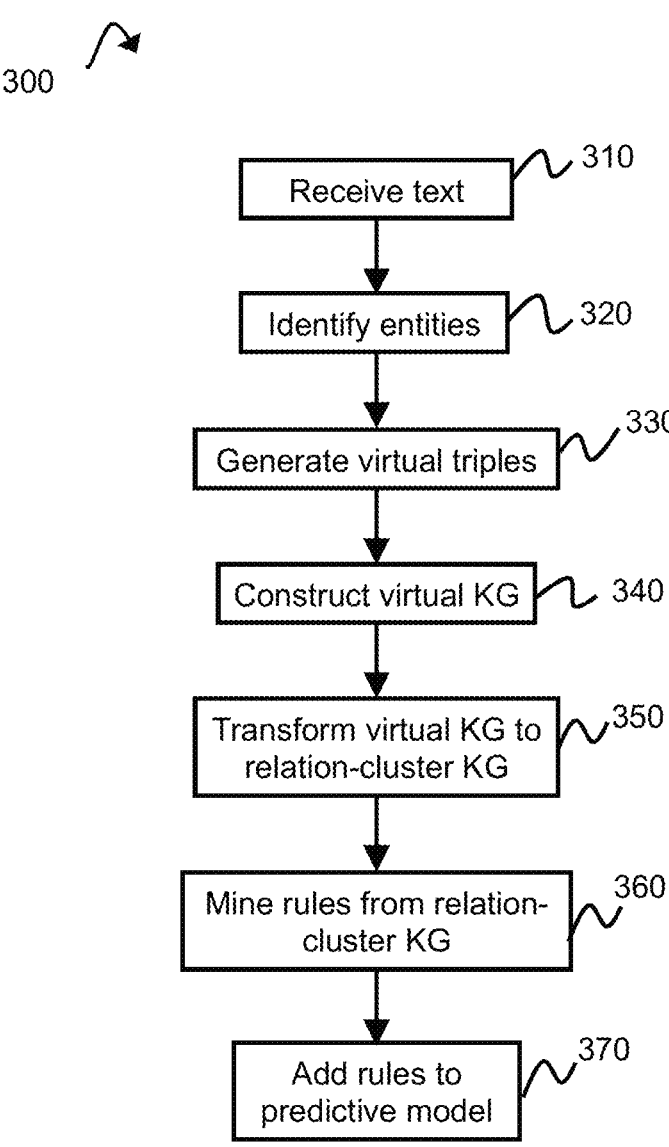
FIG. 3 is a flow diagram illustrating a process of knowledge graph construction and rule mining, according to some embodiments of the present disclosure.

FIG. 3 is a flow diagram illustrating a process 300 of rule mining, according to some embodiments of the present disclosure. To illustrate process 300, but not to limit embodiments, FIG. 3 is described within the context of environment 100 illustrated in FIG. 1. Where elements referred to in FIG. 3 are identical to elements shown in FIG. 1, the same reference numbers are used in each figure.

An input text 110 is received. This is illustrated at operation 310. In addition, input configuration parameters (e.g., number of clusters k) can be received at operation 310. The input text 110 can be any appropriate text data from a document, corpus, knowledge base, etc. Named entities in the text 110 can be identified by the identity detector 123. This is illustrated at operation 320. For example, named entities (e.g., people, concepts, places, objects, etc.) from each sentence in a text corpus may be identified. Any appropriate entity linking tools (e.g., long-short term memory (LSTM)-convolutional neural network (CNN), latent relationship modeling, zero-shot entity linking, etc.) may be used to find the named entities.

Relation embedding vectors can be obtained for pairs of the named entities or embedding vector representations of the entities and used to generate virtual triples. This is illustrated at operation 330. For example, a set of virtual triples can include two or more named entities from the text 110 and, for each pair of entities, a vector R that represents a distributed relationship between the entities. For example, a relation embedding vector R for a pair of named entities represented by tuple (X, Y) can be used to generate a triple (X, R, Y). A set of virtual triples may be, for example, [(X, R1, Z), (Y, R2, Z), . . . ], where X, Y, Z are entities and R1, R2 are embedding vectors.

A virtual KG can be constructed for the text 110 (e.g., by virtual KG generator 126). This is illustrated at operation 340. The virtual KG contains the virtual triples and represents the relations between named entities as semantic relation embeddings. The virtual KG can be transformed into a relation-cluster KG. This is illustrated at operation 350. To do so, the relation embedding vectors of the virtual KG can be clustered using various unsupervised clustering approaches, such as k-means clustering. The virtual KG can be refactored by assigning a cluster ID as a label of a relation between entities. In the relation-cluster KG, each of the relation embeddings can be replaced with an associated cluster ID having a centroid embedding vector C. Cluster centroids can be used as features for edges in the relation-cluster KG. Knowledge graph construction and transformation is discussed in greater detail with respect to FIGS. 1 and 2.

Rules can be mined from the relation-cluster KG. This is illustrated at operation 360. For example, the relation-cluster KG generated at operation 350 may have triples (X, C1, Z) and (Y, C2, Z), where C1 and C2 are relation cluster IDs. In this example, the rule mining component 130 of environment 100 may extract a rule such as (X, C1, Z) AND (Y, C2, Z)=>(X, C3, Y), where C1, C2, and C3 are relation cluster IDs.

At least one rule mined from the relation-cluster KG can be added to a prediction model 140. This is illustrated at operation 370. For example, a set of rules may be input into a soft reasoning module (e.g., prediction model 140, FIG. 1). A prediction can be generated based on new virtual triples and the rules. In some embodiments, a query can be checked using distances between relation embedding vectors of the new virtual triples and clusters of a relation-cluster KG. This is discussed in greater detail above.

Figure 4:
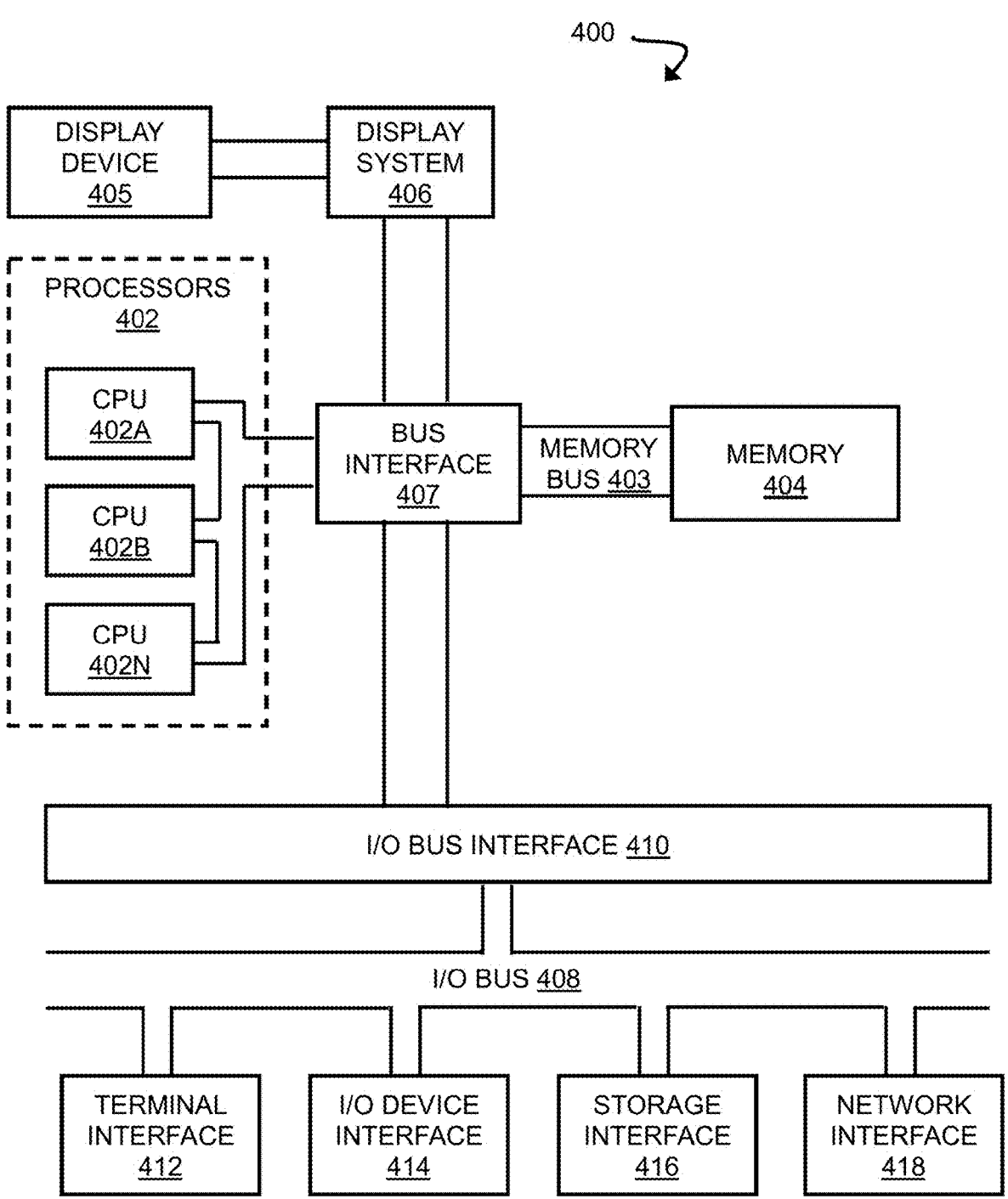
FIG. 4 is a block diagram illustrating a computer system, according to some embodiments of the present disclosure.

FIG. 4 is a block diagram illustrating an exemplary computer system 400 that can be used in implementing one or more of the methods, tools, components, and any related functions described herein (e.g., using one or more processor circuits or computer processors of the computer). In some embodiments, the major components of the computer system 400 comprise one or more processors 402, a memory subsystem 404, a terminal interface 412, a storage interface 416, an input/output device interface 414, and a network interface 418, all of which can be communicatively coupled, directly or indirectly, for inter-component communication via a memory bus 403, an input/output bus 408, bus interface unit 407, and an input/output bus interface unit 410.

The computer system 400 contains one or more general-purpose programmable central processing units (CPUs) 402A, 402B, and 402-N, herein collectively referred to as the CPU 402. In some embodiments, the computer system 400 contains multiple processors typical of a relatively large system; however, in other embodiments the computer system 400 can alternatively be a single CPU system. Each CPU 402 may execute instructions stored in the memory subsystem 404 and can include one or more levels of on-board cache.

The memory 404 can include a random-access semiconductor memory, storage device, or storage medium (either volatile or non-volatile) for storing or encoding data and programs. In some embodiments, the memory 404 represents the entire virtual memory of the computer system 400 and may also include the virtual memory of other computer systems coupled to the computer system 400 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

Components of environment 100 (FIG. 1) can be included within the memory 404 in the computer system 400. However, in other embodiments, some or all of these components may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, components of the memory 404 are not necessarily all completely contained in the same storage device at the same time. Further, although components of environment 100 are illustrated as being separate entities, in other embodiments some of these components, portions of some of these components, or all of these components may be packaged together.

In an embodiment, components of environment 100 include instructions that execute on the processor 402 or instructions that are interpreted by instructions that execute on the processor 402 to carry out the functions as further described in this disclosure. In another embodiment, components of environment 100 are implemented in hardware via semiconductor devices, chips, logical gates, circuits, circuit cards, and/or other physical hardware devices in lieu of, or in addition to, a processor-based system. In another embodiment, components of environment 100 include data in addition to instructions.

Although the memory bus 403 is shown in FIG. 4 as a single bus structure providing a direct communication path among the CPUs 402, the memory subsystem 404, the display system 406, the bus interface 407, and the input/output bus interface 410, the memory bus 403 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 410 and the input/output bus 408 are shown as single respective units, the computer system 400 may, in some embodiments, contain multiple input/output bus interface units 410, multiple input/output buses 408, or both. Further, while multiple input/output interface units are shown, which separate the input/output bus 408 from various communications paths running to the various input/output devices, in other embodiments some or all of the input/output devices may be connected directly to one or more system input/output buses.

The computer system 400 may include a bus interface unit 407 to handle communications among the processor 402, the memory 404, a display system 406, and the input/output bus interface unit 410. The input/output bus interface unit 410 may be coupled with the input/output bus 408 for transferring data to and from the various input/output units. The input/output bus interface unit 410 communicates with multiple input/output interface units 412, 414, 416, and 418, which are also known as input/output processors (IOPs) or input/output adapters (IOAs), through the input/output bus

408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 is a multi-user mainframe computer system, a single-user system, or a server computer or similar device that has little or no direct user interface but receives requests from other computer systems (clients). Further, in some embodiments, the computer system 400 is implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, Components other than or in addition to those shown in FIG. 4 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
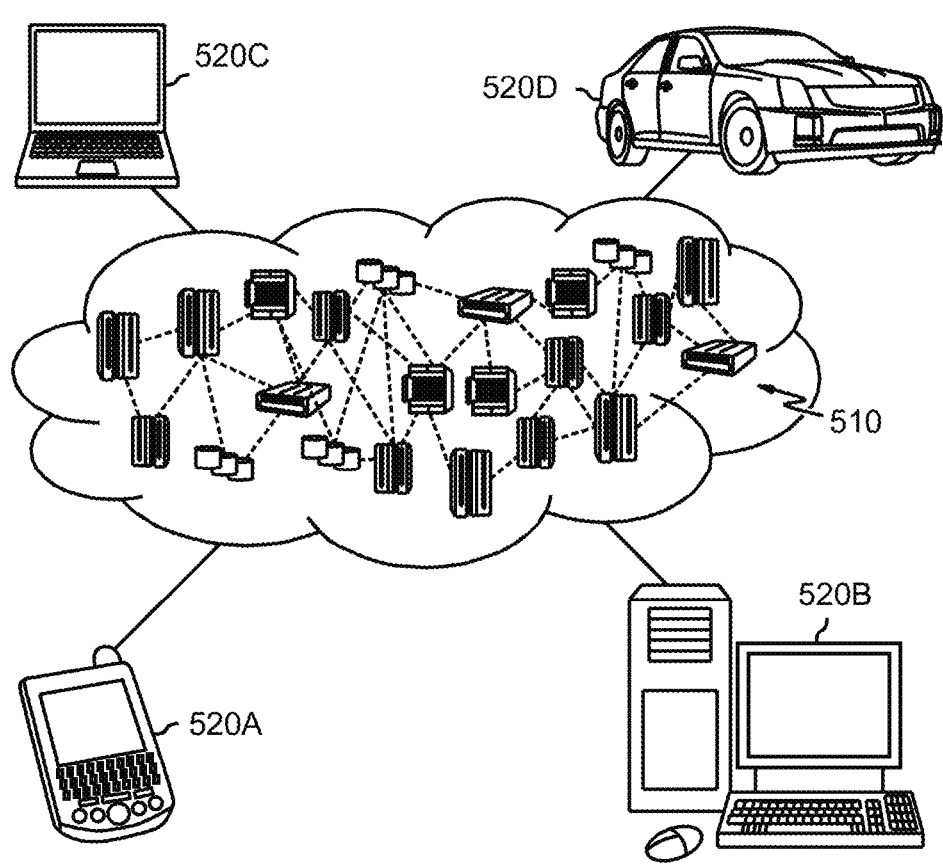
FIG. 5 is a block diagram illustrating a cloud computing environment, according to some embodiments of the present disclosure.

FIG. 5 is a block diagram illustrating a cloud computing environment 500, according to some embodiments of the present disclosure. As shown, cloud computing environment 500 includes one or more cloud computing nodes 510 with which local computing devices used by cloud consumers, such as, for example, personal digital assistant (PDA) or cellular telephone 520A, desktop computer 520B, laptop computer 520C, and/or automobile computer system 520D may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520A-520D shown in FIG. 4 are intended to be illustrative only and that computing nodes 510 and cloud computing environment 500 can communicate with any type of computerized device over any type of network and/or network addressable connection (e.g., using a web browser).

Figure 6:
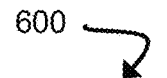
FIG. 6 is a block diagram illustrating a set of functional abstraction model layers provided by the cloud computing environment, according to some embodiments of the present disclosure.
Figure 6:
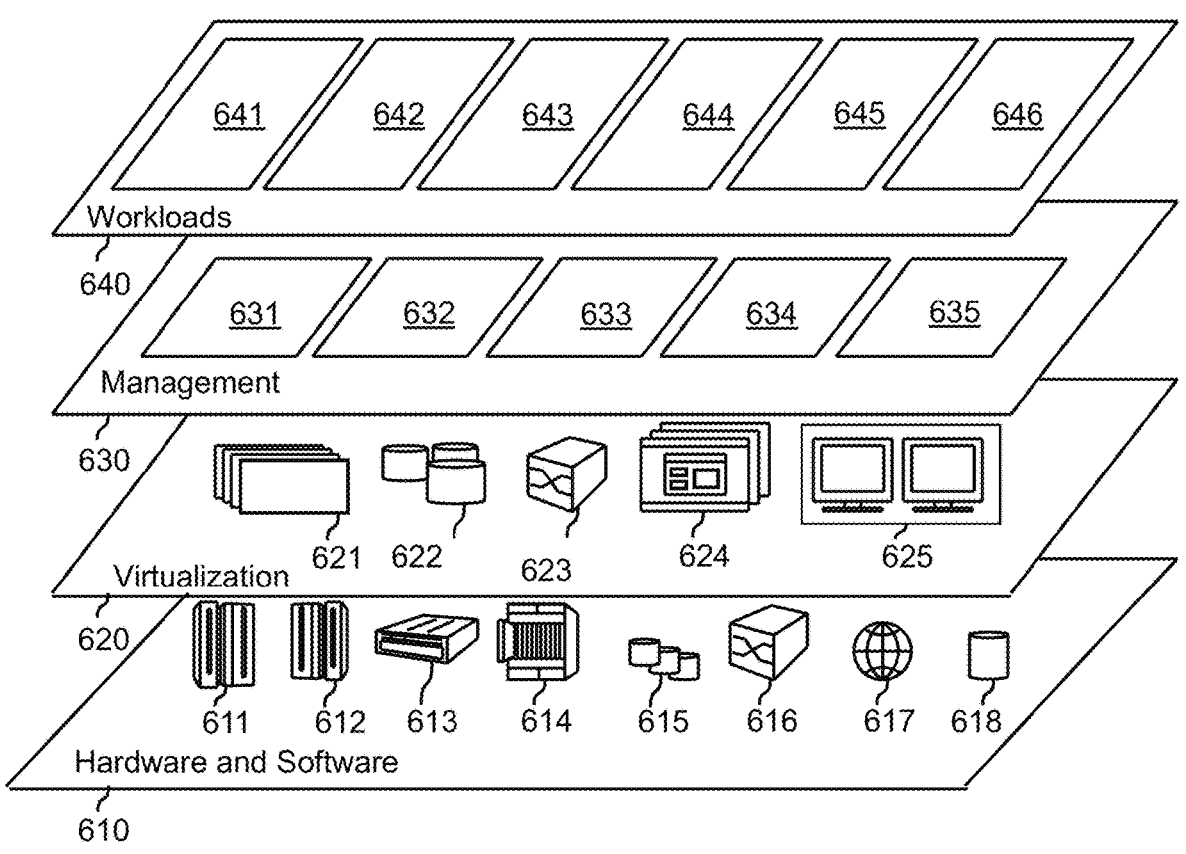

FIG. 6 is a block diagram illustrating a set of functional abstraction model layers 600 provided by the cloud computing environment 500, according to some embodiments of the present disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 provides the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment can be utilized. Examples of workloads and functions that can be provided from this layer include: mapping and navigation 641; software development and lifecycle management 642; virtual classroom education delivery 643; data analytics processing 644; transaction processing 645; and rule mining based on knowledge graphs constructed without supervision 646.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
receiving an input text;
parsing, by a natural language processor, the input text to extract subject-predicate-object triplets in which the subject and object are named entities related to one another by the predicate;
generating a set of virtual triples comprising nodes representing subject-object pairs and relation embedding vectors representing corresponding predicates from the subject-predicate-object triplets;
constructing, unsupervised, a virtual knowledge graph (KG) with the set of virtual triples;
transforming the virtual KG into a relation-cluster KG, wherein the transforming comprises:
clustering the relation embedding vectors; and
replacing the relation embedding vectors with associated cluster identifiers (IDs);
mining logical rules from the relation-cluster KG;
generating a predictive model using the logical rules;
receiving a query comprising new input text; and
generating a response to the query, wherein the generating the response comprises:
generating new virtual triples comprising new subject-object pairs and new relation embedding vectors from the new input text;
replacing the new relation embedding vectors with closest cluster IDs from the virtual KG graph; and
obtaining, by the predictive model, a prediction based on at least one of the logical rules and the new virtual triples comprising the closest cluster IDs.

2. The method of claim 1, further comprising receiving at least one input configuration parameter, wherein the at least one input configuration parameter comprises a number of clusters in the relation-cluster KG.

3. The method of claim 1, wherein the generating the response further comprises identifying the closest cluster IDs by determining a distance between a relation embedding vector from one of the new virtual triples and a cluster centroid in the relation-cluster KG.

4. The method of claim 1, wherein the transforming further comprises:
refactoring the virtual KG with the cluster IDs.

5. The method of claim 4, wherein the each of the cluster IDs comprises a centroid embedding vector.

6. The method of claim 1, wherein the parsing comprises transforming the input text into an Abstract Meaning Representation (AMR).

7. The method of claim 6, wherein the relation embedding vectors are obtained by learning embedding vectors of paths or trees connecting nodes in the AMR.

8. A system, comprising:
a memory; and
a processor communicatively coupled to the memory, wherein the processor is configured to perform a method comprising:
receiving an input text;
parsing, by a natural language processor, the input text to extract subject-predicate-object triplets in which the subject and object are named entities related to one another by the predicate;
generating a set of virtual triples comprising nodes representing subject-object pairs and relation embedding vectors representing corresponding predicates from the subject-predicate-object triplets;

constructing, unsupervised, a virtual knowledge graph (KG) with the set of virtual triples;

transforming the virtual KG into a relation-cluster KG, wherein the transforming comprises:

clustering the relation embedding vectors; and replacing the relation embedding vectors with associated cluster identifiers (IDs);

mining logical rules from the relation-cluster KG;

generating a predictive model using the logical rules;

receiving a query comprising new input text; and generating a response to the query, wherein the generating the response comprises:

generating new virtual triples comprising new subject-object pairs and new relation embedding vectors from the new input text;

replacing the new relation embedding vectors with closest cluster IDs from the virtual KG graph; and obtaining, by the predictive model, a prediction based on at least one of the logical rules and the new virtual triples comprising the closest cluster IDs.

9. The system of claim 8, further comprising receiving at least one input configuration parameter, wherein the at least one input configuration parameter comprises a number of clusters in the relation-cluster KG.

10. The system of claim 8, wherein the generating the response further comprises identifying the closest cluster IDs by determining a distance between a relation embedding vector from one of the new virtual triples and a cluster centroid in the relation-cluster KG.

11. The system of claim 8, wherein the transforming further comprises:

refactoring the virtual KG with the cluster IDs.

12. The system of claim 11, wherein the each of the cluster IDs comprises a centroid embedding vector.

13. The system of claim 8, wherein the parsing comprises transforming the input text into an Abstract Meaning Representation (AMR).

14. The system of claim 13, wherein the relation embedding vectors are obtained by learning embedding vectors of paths or trees connecting nodes in the AMR.

15. A computer program product, the computer program product comprising a computer readable storage medium having program instructions embodied therewith, the program instructions executable by a processor to cause a device to perform a method, the method comprising:

receiving an input text;

parsing, by a natural language processor, the input text to extract subject-predicate-object triplets in which the subject and object are named entities related to one another by the predicate;

generating a set of virtual triples comprising nodes representing subject-object and relation embedding vectors representing corresponding predicates from the subject-predicate-object triplets;

constructing, unsupervised, a virtual knowledge graph (KG) with the set of virtual triples;

transforming the virtual KG into a relation-cluster KG, wherein the transforming comprises:

clustering the relation embedding vectors; and replacing the relation embedding vectors with associated cluster identifiers (IDs);

mining logical rules from the relation-cluster KG;

generating a predictive model using the logical rules;

receiving a query comprising new input text; and generating a response to the query, wherein the generating the response comprises:

generating new virtual triples comprising new subject-object pairs and new relation embedding vectors from the new input text;

replacing the new relation embedding vectors with closest cluster IDs from the virtual KG graph; and obtaining, by the predictive model, a prediction based on at least one of the logical rules and the new virtual triples comprising the closest cluster IDs.

16. The computer program product of claim 15, wherein the transforming further comprises:

refactoring the virtual KG with the cluster IDs.

17. The computer program product of claim 16, wherein the each of the cluster IDs comprises a centroid embedding vector.

18. The method of claim 1, wherein the new virtual triples comprise a query triple and at least one factual triple, and wherein the obtaining the prediction comprises determining whether the query triple is a true statement.

19. The method of claim 1, wherein the predictive model is selected from the group consisting of a soft reasoning model, a question-answering model, and a domain-specific rules engine.

20. The method of claim 1, wherein the input text comprises at least one unstructured text document.

* * * * *